United States Patent [19]

Namiki et al.

[11] 4,367,555
[45] Jan. 4, 1983

[54] DIGITAL EQUALIZER FOR A CROSS-POLARIZATION RECEIVER

[75] Inventors: Junji Namiki; Yukitsuna Furuya, both of Tokyo, Japan

[73] Assignee: Nippon Electric Co., Ltd., Tokyo, Japan

[21] Appl. No.: 170,640

[22] Filed: Jul. 21, 1980

[30] Foreign Application Priority Data

| Jul. 24, 1979 | [JP] | Japan | 54-94042 |
| Jul. 24, 1979 | [JP] | Japan | 54-94043 |
| Jul. 24, 1979 | [JP] | Japan | 54-94044 |
| Jul. 24, 1979 | [JP] | Japan | 54-94045 |
| Dec. 12, 1979 | [JP] | Japan | 54-161330 |
| Dec. 12, 1979 | [JP] | Japan | 54-161331 |

[51] Int. Cl.³ .............................................. H04B 1/12
[52] U.S. Cl. ........................................ 375/11; 375/99; 333/18; 328/165
[58] Field of Search ..................... 375/11–16, 375/99, 51, 57, 118; 333/18; 328/162–166; 329/104, 110; 343/100 PE; 455/60–65

[56] References Cited

U.S. PATENT DOCUMENTS

| 3,689,924 | 9/1972 | Caruso, Jr. | 343/100 PE |
| 3,735,266 | 5/1973 | Amitay | 455/60 |
| 4,100,369 | 7/1978 | Stenstrom | 375/57 |
| 4,105,977 | 8/1978 | Fitting et al. | 343/100 PE |
| 4,112,370 | 9/1978 | Monsen | 370/6 |
| 4,220,923 | 9/1980 | Pelchat | 333/18 |

Primary Examiner—Benedict V. Safourek
Assistant Examiner—Stephen Chin
Attorney, Agent, or Firm—Laff, Whitesel, Conte & Saret

[57] ABSTRACT

An equalizer corrects cross-polarization distortion which occurs between two series of digital signals which are transmitted on individually associated ones of two mutually orthogonal cross-polarized waves. The distortion is corrected when a circuit discriminates between the two series of digital signals and gives an output signal which represents a value judgment as to the amount of distortion which has occurred. The output signal serves as an address for selecting one of many memory element circuits, each element circuit having a predetermined value stored therein. The value stored in the selected memory element circuit is subtracted from one series of the digital signals. The idea is that, during transmission, something (e.g., raindrops) transfers energy from one to the other of the cross-polarized waves. The equalizer circuit passes judgment as to how much energy has been transferred, and then subtracts that amount of energy in order to return to the original signal. The circuit also corrects for rotation of the two mutual orthogonal waves about their common axis.

5 Claims, 20 Drawing Figures

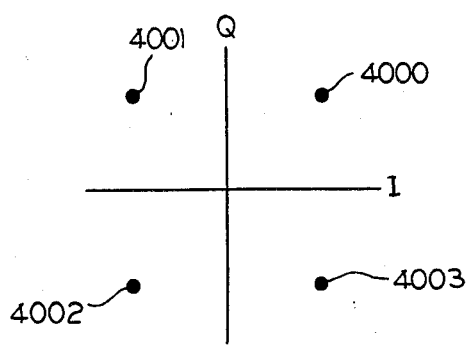
FIG. 1a
FIG. 1b
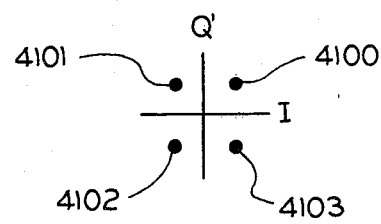
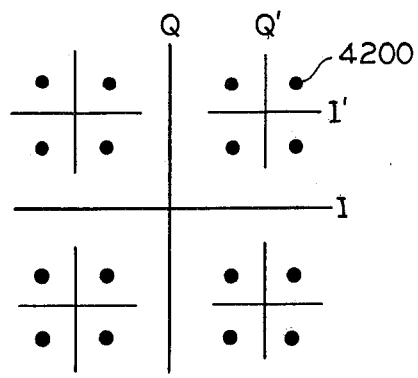
FIG. 2a
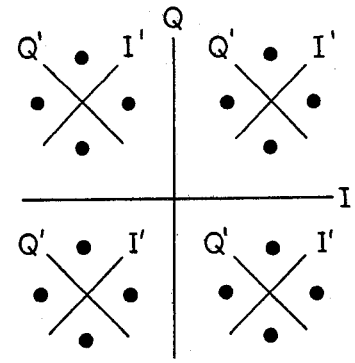
FIG. 2b
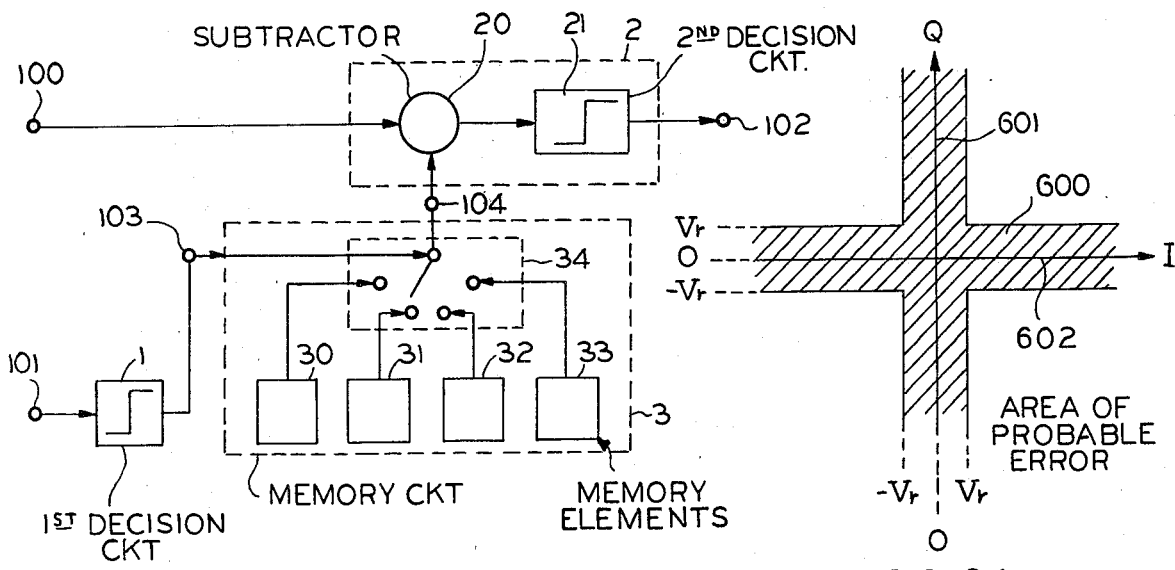
FIG. 3
FIG. 6A

DIGITAL EQUALIZER FOR A CROSS-POLARIZATION RECEIVER

The present invention relates to a device for cancelling cross-polarization interference which occurs in high-frequency digital transmission over microwaves, or the like.

Radio communication using the microwave spectrum has made rapid progress, especially in the fields of terrestrial and satellite communications. The need for radio communication is also expected to expand greatly in mobile communication service. Hence, there is a substantial need for a reuse of currently utilized frequency bands, in addition to an exploitation of the quasi-millimeter wave channels and even high-frequency channels.

One approach to satisfy these needs involves an efficient use of cross-polarizations in the frequency channel allocation for 4 to 6 GHz FM (frequency modulation) transmission. The utility of this band is highest in a fixed communication service using radio-relay systems. For example, the International Telecommunications Satellite Organization (INTELSAT) is likely to adopt standards calling for a cross-polarization (instead of a single polarization) sharing one frequency allocation. These standards will likely be used in the V series of satellites, operating in the 4 to 6 GHz band.

To achieve such a cross-polarization, band-sharing, it is necessary to cancel cross-polarization interference. For example, this form of interference may occur when raindrops transfer energy from one polarized signal to another polarized signal sharing the same frequency. Thus, it is necessary to compensate for signal deterioration caused by rainfall polarization of a propagation wave. An improvemet is also desirable in the polarization characteristics of antennas and power feed systems.

Free space enables an independend transmission of cross-polarized waves through two independent paths. However, rainfall causes anisotropy in each transmission path. Therefore, cross-coupling causes an unfavorable interference between the cross-polarized waves (i.e., depolarization), if a cross-polarization sharing system is used.

In an antenna feed system or a radio receiver, an equalization circuit cancels cross-polarization interference and proves an automatic compensation for such cross-coupling between cross-polarized waves.

Analog transmission (mainly FM transmission) has been used in the microwave band communication. Practical systems have been designed for cancelling cross-polarization interference by restoring orthogonal relationships. In the intermediate frequency (IF) band, a variable phase shifter and an attenuator are coupled around an antenna feed system or are arranged to cancel interference between individually cross-polarized waves by means of an interference-cancelling circuit. For details of this latter type of a cancelling system, reference may be made to an IEEE paper by Lin-shan Lee, entitled "New Automatic Polarization Cancelling Control for Multiple-Station Satellite Communication Systems," International Communications Conference Record, 1978, pp. 43.3.1-43.3.5. However, this Lin-Shan Lee system is both complicated and incapable of properly eliminating interference between cross-polarized waves.

Digital transmission is also used in the microwave band during recent years. There is a greatly enhanced need for a more efficient digital transmission system for cancelling cross-polarization interference. To meet this need, a digital equalizer, for use in a cross-polarization receiver, has been described in U.S. patent application Ser. No. 125,671 filed Feb. 28, 1980 by Junji Namiki. However, this equalizer is not too well suited for high-speed digital processing because it uses many multipliers.

Therefore, an object of the present invention is to provide new and improved equalizers which are free from the above-mentioned disadvantages. Here, an object is to provide equalizers for use in cross-polarization receivers.

According to one aspect of this invention, it is possible to achieve digital transmission based on a cross-polarization sharing of a frequency band by using conventional antenna systems and intermediate frequency equipment which do not have a sufficient cross-polarization discrimination.

At present, highly accurate cross-polarization discrimination cannot be expected because the beam width of a communication satellite antennas is considerably greater than the width of a terrestrial microwave channel. The increased beam width is used because global beam antennas use assymetrical beams to increase effective radiation power, and because Faraday rotation occurs in outer space.

In such a transmission system, the inventive equalizer proves far superior to any comparable prior art system. Moreover, the inventive equalizer is quite economical in that it does not require modification of conventional signal radiation systems. The inventive equalizer also enables cross-polarization cancellation in each transmission station, even if signals transmitted from many stations are received by the same antenna, in a time-division fashion as, in a time-division multiple access (TDMA) system.

In accordance with an aspect of this invention, an equalizer is used in digital radio transmission system. First and second mutually independent sequences of digital data are transmitted via first and second mutually orthogonal cross-polarized waves. A frist decision circuit distinguishes the second sequence of data and causes a memory circuit to select one of a plurality of memory elements, which supplies a predetermined constant signal corresponding to the output of the decision circuit. A subtractor subtracts the output of the selected memory element from the first sequence of data. A second decision circuit distinguishes the first sequence of data in the output of the subtractor.

The advantages and features of the invention will become more apparent from the following detailed description, taken in conjunction with the accompanying drawings, wherein:

FIGS. 1(a) and (b) are diagrams showing quadrature phase shift keying (QPSK) demodulated data on orthogonal phase planes;

FIGS. 2(a) and (b) are diagrams for describing coherently detected signals which have been subjected to cross-polarization interference;

FIG. 3 is a block diagram of one embodiment of the present invention;

FIG. 6A is a diagram illustrating voltage regions in which possible errors may be detected;

The same reference numerals identify corresponding parts throughout the entire drawings, and each signal path carries a plurality of bits.

Figure 4:
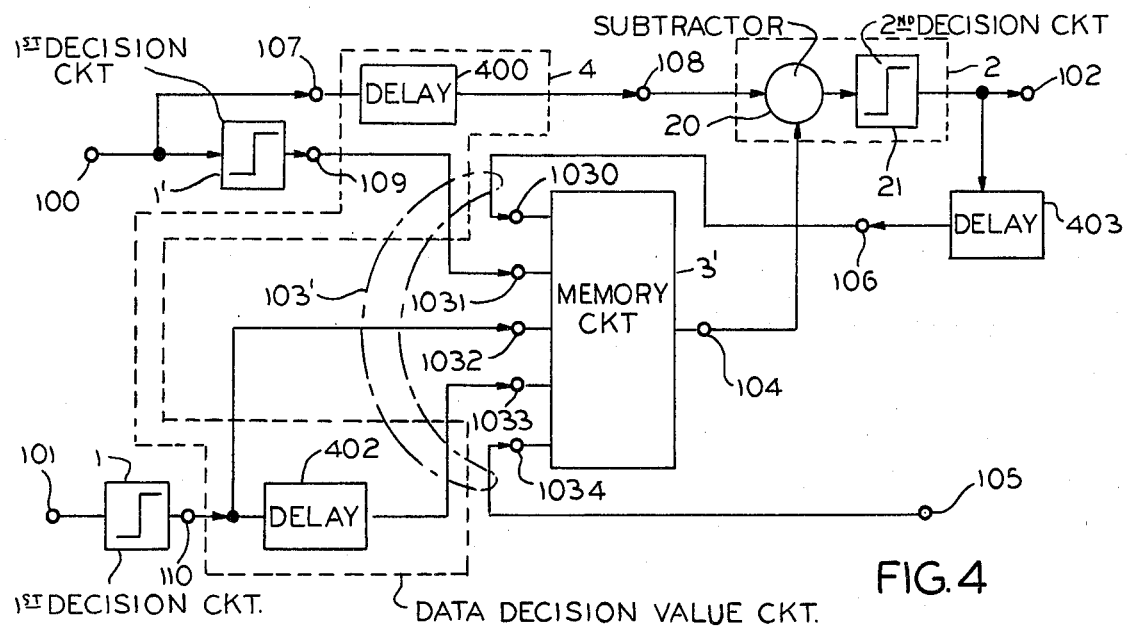
FIG. 4 is a block diagram of a second embodiment of the invention.

FIGS. 1(a) and (b) show four data points of QPSK modulated signals represented on orthogonal phase (IQ) planes. Reference numerals 4000, 4001, 4002 and 4003 identify a first sequence of data received over a first polarized wave, and reference numerals 4100, 4101, 4102 and 4103 identify a second sequence of data received over a second polarized wave.

FIG. 2 shows what happens when cross-polarization interference occurs on the transmission path. By coherent detection of the first polarized wave, the sampled values of demodulated baseband signals are a superimposition (FIGS. 2(a) and (b)) of the four data points of FIG. 1(a) on those of FIG. 1(b). The data points of FIG. 1(b) are interference components having a level which is lower than the level of the data points of FIG. 1(a). On the data point 4000 of FIG. 1(a), for example, one (for example, 4100) of the four points of FIG. 1(b) is superimposed as an interference component. The result is that the data point 4200 of FIG. 2(a) is obtained.

For details of such a data point arrangement on the IQ plane, reference may be made to page 233 of "DATA TRANSMISSION" by William R. Bennett and James R. Davey published in 1965 by McGraw-Hill, Inc.

FIG. 2(a) shows data point arrangements resulting from the in-phase superimposition of interference components on the first sequence of data. FIG. 2(b) shows the same thing with the superimposition being 45 degrees out of phase.

Thus, it is seen that interference components contained in the first sequence of data have constants corresponding to the decision values of the second sequence of data.

This means that such cross-polarization interference can be eliminated. The decision values of the second sequence of data are obtained, by subtracting constants corresponding to these decision values, as interference components, from the detected data on the first polarized wave, when the cross-polarization interference is present.

All of the signals handled in various sections of FIG. 3 are complex digital signals. Any suitable means (not shown) feeds the detected data relative to the first and second polarized waves into the terminals 100 and 101, respectively. Accordingly, the second sequence of data is superimposed along with the first polarized wave appearing on the terminal 100. The second sequence of data is the interference components, as indicated in FIG. 2.

A decision circuit 1 converts the detected second sequence of data supplied through the terminals 101 into a decision value of the second sequence of data. If the signal distortion of the second sequence of data is below a certain level, the error rate of the decision circuit is sufficiently low.

Each of the decision values thus obtained from circuit 1 serves as an address signal which appears at terminal 103 and is used to control a signal line selector 34 in a memory circuit 3. In response to the address signal appearing at terminal 103, one memory element is selected from among the four memory elements 30, 31, 32 and 33. Each memory element is a read-only memory (ROM) which stores a constant signal that corresponds to a particular decision value. The selected constant signal appears at an output terminal 104.

Meanwhile, the detected first sequence of data appearing at the terminal 100 is fed to the minuend terminal of a substractor 20. Each constant signal value appearing on the output terminal 104 of the memory circuit 3 is subtracted from the input data, as the corresponding interference component. Terminal 104 is the subtrahend terminal of the subtractor 20. As a result, the subtractor 20 recovers the the originally transmitted first sequence of data, free from the interference components caused by the second sequence of data.

This subtractor 20 output is then supplied to a second decision circuit 21, which has the same structure as the decision circuit 1, to produce the correct decision values of the first sequence of data. In the same manner, a similar cross-polarization cancelling circuit (not shown) can be operated simultaneously for eliminating interference from the second sequence of data.

FIG. 4 is a block diagram of a second embodiment of the invention. When non-regenerative repeating is achieved in a radio transmission system, multiple cross-polarization interferences occur at different propagation path lengths. Moreover, the transmitted signals themselves alter their own propagation path lengths and may return as interference components.

In such a case, an intersymbol interference may occur with a result that the values of a few symbols may affect one another. These effects may occur both before and after each sample value (symbol) of the reception signals corresponding to the first and second sequences of data which are to be distinguished from each other. As a result, if the transmission path is linear, such influence will be additive. Therefore, the interference components should be considered in relation to the first and second sequences of data of N (N is a positive integer) symbols, both before and after the distinguished data.

For the embodiment of FIG. 4, the number of N symbols is assumed to be 1. It is also assumed that there is an interference component corresponding to each of five symbols. That is, there are five interference components corresponding to consecutive symbols $\hat{H}(-T)$ and $\hat{H}(T)$ (the decision value $\hat{H}(O)$ being excluded), for H(kT) of the first sequence of data, and for consecutive symbols $\hat{V}(-T)$, $\hat{V}(O)$ and $\hat{V}(T)$, for V(kT) of the second sequence of data. Consequently, a memory circuit 3' has five input terminals 103' (1030, 1031, 1032, 1033 and 1034) which are counterparts to the input terminal 103 of the memory circuit 3 shown in FIG. 3.

This embodiment further includes a first decision circuit 1 for the first sequence of data in order to obtain the decision values $\hat{H}(T)$ and $\hat{V}(T)$ for the succeeding data, at the time when the decision is made. A succeeding data-decision value-supplying circuit 4 has two one-symbol delay circuits, 400 and 402. The decision values $\hat{H}(-T)$ and $\hat{V}(-T)$ are made for the data immediately preceding the time when the decision occurs. The value $\hat{H}(-T)$ is stored as an already established value in a delay circuit 403. The value $\hat{V}(-T)$ is also stored in the corresponding delay circuit (not shown) of a similar cross-polarization cancelling circuit (not illustrated) for the second sequence of data, and is supplied to an input terminal 105.

Interference components are inherent to the decision values $\hat{H}(-T)$, $\hat{H}(T)$, $\hat{V}(-T)$, $\hat{V}(O)$ and $\hat{V}(T)$ and, consequently, are supplied to the output terminal 104 of the memory circuit 3'. Block 2 of FIG. 4 is identical with block 2 of FIG. 3, and correct decision values are obtained at its output terminal 102 for the first sequence of data.

Figure 6B:
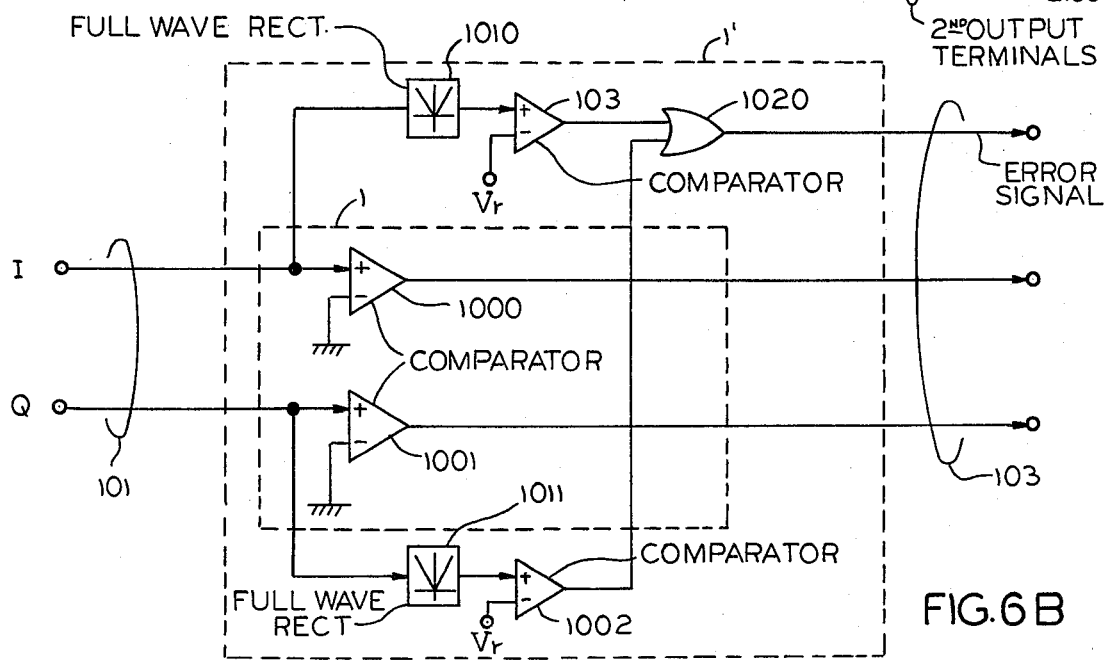
FIG. 6B is a block diagram showing a decision circuit for detecting the errors in the regions depicted in FIG. 6A.

The first and second embodiments use decision circuits 1 and 21, each of which is composed of two comparators 1000 and 1001 as illustrated in FIG. 6B. In FIG. 6B, each of the comparators 1000 and 1001 compares the input signal with the ground (O) level, so that a decision output is produced.

Figure 5:
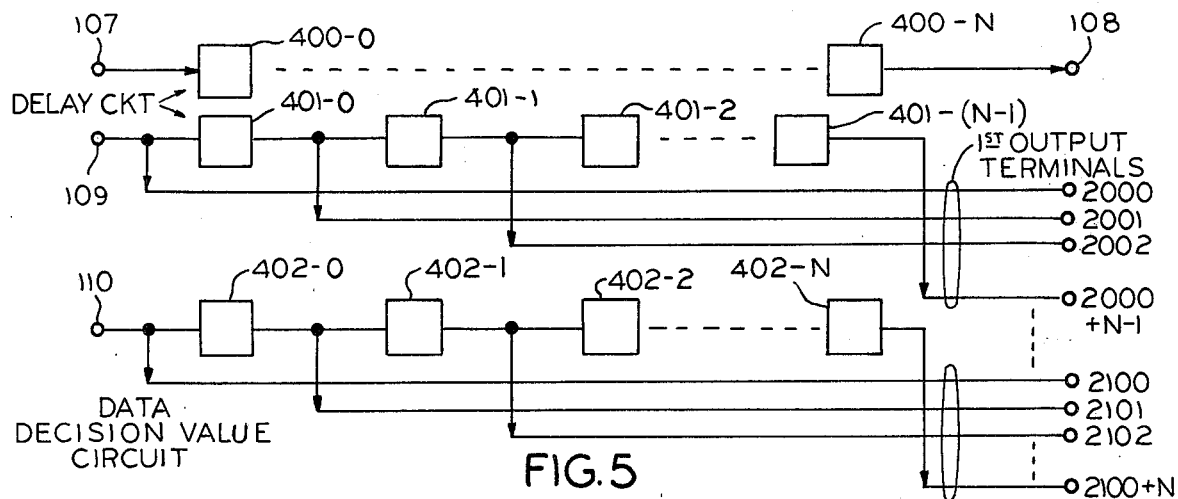
FIG. 5 is a block diagram which illustrates a data decision, value supplying part of the first and second embodiments.

FIG. 5 illustrates, in detail, the succeeding data-decision value-supplying circuit 4, for a generalized value of N. The series of decision values $\hat{H}(NT)$, $\hat{H}(N-1)T)$, . . . , appear at one set of output terminals 2000, 2001, . . . , and (2000+N−1). The other series of decision values $\hat{H}(T)$, and $\hat{V}(NT)$, $\hat{V}((N-1)T)$, . . . , and V(O), appear at the other set of output terminals 2100, 2101, 111, and (2100+N). Both of these series are addresses fed to the input terminals of the memory circuit 3'.

As discussed above, the present invention enables a cancellation of cross-polarization interference by a simplified circuit structure. Therefore, it is suitable for use in a practical system.

Further, as stated above, the invention does not require any modification of IF circuits, or the like, because it achieves the cancellation in the baseband, and can effectively respond to a time-division signal, even when they are received from a plurality of stations.

Next, the decisions, which are produced by the decision circuit 1 (FIGS. 3 and 4), are always supposed to be correct. However, they are often false because a considerable amount of noise is actually superimposed on the input signals. If the decisions are false, the inherent values read out of the memory circuit 3 or 3' are different from what they are supposed to be. As a result, the proper elimination of interference components cannot be achieved, based on inherent values.

To solve this problem, it is possible to slightly modify the structure of the decision circuit 1. Possibly, it can give an error output, instead of normal decision values, when there is a likelihood that the decision values may be false.

FIG. 6A shows the decision region for four data points on the IQ phase plane for the QPSK modulated signals which are shown in FIG. 1(a). The reference numerals 601 and 602 indicate the usual boundaries of a decision. Also, the symbol $V_r$ (or $-V_r$) represents the reference voltages along the two boundaries 601, 602. The cross-hatched areas spanning the boundaries are regions in which possible errors may be detected. Thus, any signal generated within the cross-hatched region beyond the boundaries 601 and 602 is very likely to give an erroneous decision value.

A circuit for accomplishing the error-weighed decision indicated by FIG. 6A can be realized by a use of the structure of FIG. 6B. The reference numerals 1010 and 1011; 1003 and 1002; and 1020, respectively, represent absolute value circuits, comprising full-wave rectifiers, comparators and an OR circuit.

A third embodiment (FIG. 7) has the same structure as that shown in FIG. 3. However, the first decision circuit 1' is arranged to give a possible error output when the signal appears in the cross-hatched areas shown in FIG. 6A. The value appearing on the output terminal 104 depends upon the memory element 30-33, in memory circuit 3', which is selected by the selector 34, when first decision circuit 1' gives a zero possible error output signal to the input terminal 103.

In FIG. 6B, the second polarized wave from the terminal 101 is supplied not only to the absolute value circuits 1010 and 1011 for full-wave rectification but also to the comparators 1000 and 1001 for comparing the wave with the ground (O) level. The outputs of the circuits 1010 and 1011 are given to the comparators 1003 and 1002, respectively, for comparing the wave with a reference level $V_r$. The results of this comparison by the comparators 1003 and 1002 are then fed to the OR circuit 120. As a result, the outputs of the comparators 1001 and 1001 decide which one of four quadrants of FIG. 6A each sample value of the wave belongs to. Also, the output of the OR circuit 120 decides whether the sample value lies inside of the cross-hatched areas of FIG. 6A or not.

Therefore, a possible error output is produced if the decision circuit 1' gives a false decision. A zero output then emerges at the output terminal 104 of the memory circuit 3". Thus, the data coming into the input terminal 100 is not adversely affected.

Figure 7:
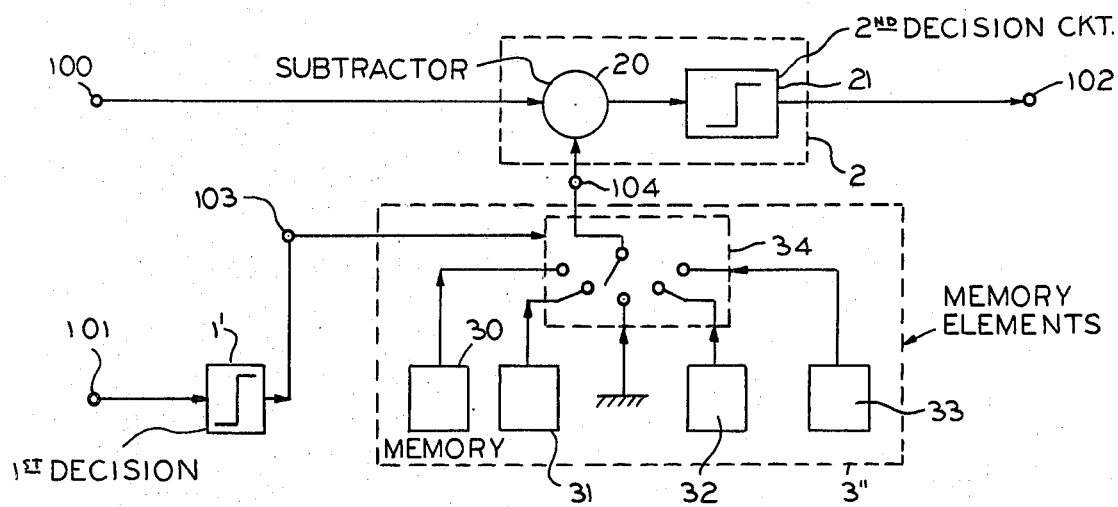
FIGS. 7 to 10 are block diagrams which illustrate third through sixth embodiments.

This structure can be applied to the more complicated block diagram of FIG. 4 by replacing the decision circuit 1 of FIG. 4 with the corresponding decision circuit of FIG. 7 and, then, the memory circuit 3' of FIG. 4 with the memory circuit 3" of FIG. 7. With this modified structure, the possible error output is given to the circuit 4 of FIG. 4. Consequently, when a possible error output emerges as the output of the circuit 4, either it can be overlooked as a "DON'T CARE" signal (unneeded input) or a zero output can be given at the output terminal 104.

Next will be discussed the situation where there is an interference caused by a variation of the cross-polarization. For this purpose, each corresponding constant stored in the memory circuit 3 must be altered to compensate for the variation.

A fourth embodiment (FIG. 8) is equipped with the structure of FIG. 3 and, in addition, a structure which successively alters the corresponding constants. Reference numeral 3''' in FIG. 8 identifies a memory circuit, which contains random access memories (RAM's). This corresponds with and contrasts to circuit 3 of FIG. 3, which contained ROM's. The memory element circuits 30-33 are ordinary random access memories (RAM's) which are capable of altering the content of each memory element. The memory element may be selected by way of the input terminal 103, and responsive to the added value of an input signal applied through terminal 111 and a signal line selector 35.

Block 5 is a memory-correcting circuit with two input terminals 102' and 112, respectively, giving the output of decision circuit 21 and subtractor 20. Terminals 102' and 112 are connected to the input of a subtractor 51. If input noise is disregarded, an error component appears at the output of the subtractor 51. This is an error value which inherently changes the decision provided by the decision circuit 1. The error component is multiplied by a constant $\alpha(|\alpha|<<1)$ in an attenuator 52.

Meanwhile, the value at the output of the memory circuit 3''' is stored in another RAM memory element 56 until a new memory content is determined. This value and the output of the attenuator 52 are sent through an adder 53 to an output terminal 111. Then, the value appearing at the terminal 111 is written into a currently selected memory element 30–33 of the circuit 3'''. During this write-in operation, the signal remains unchanged on the terminal 103, which signal is given as an address for the memory circuit 3'''. The corresponding constant selected by this signal is corrected for the residual compensation responsive to the output of the subtractor 51.

Figure 8:
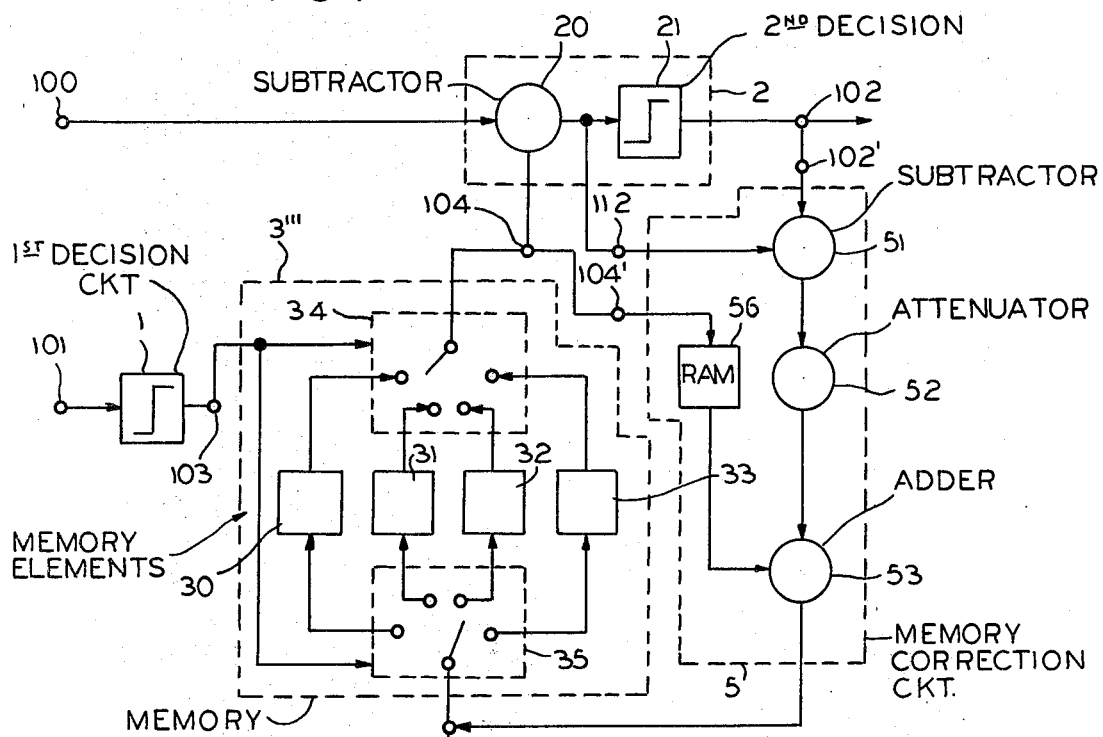
Figure 9:
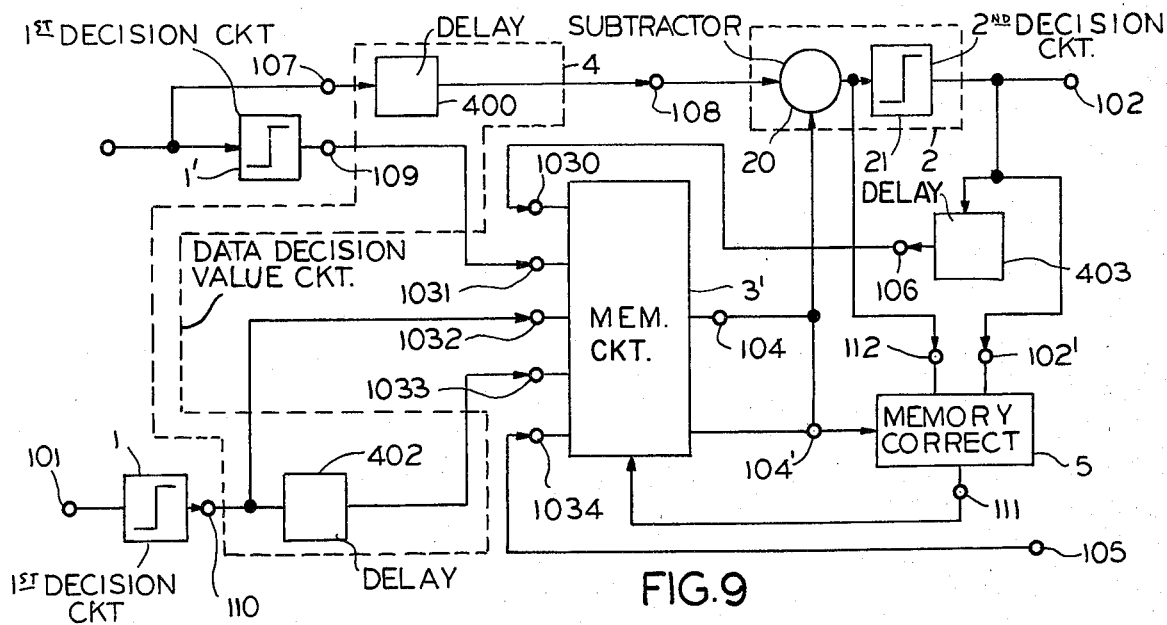

A fifth embodiment (FIG. 9) adds the memory-correcting circuit 5 of FIG. 8 to the structure illustrated in FIG. 4. Although the decision circuit 1 is always supposed to make a correct decision in the embodiments illustrated in FIGS. 8 and 9, the decision may be false if a considerable amount of noise is actually superimposed upon the input data.

Figure 10:
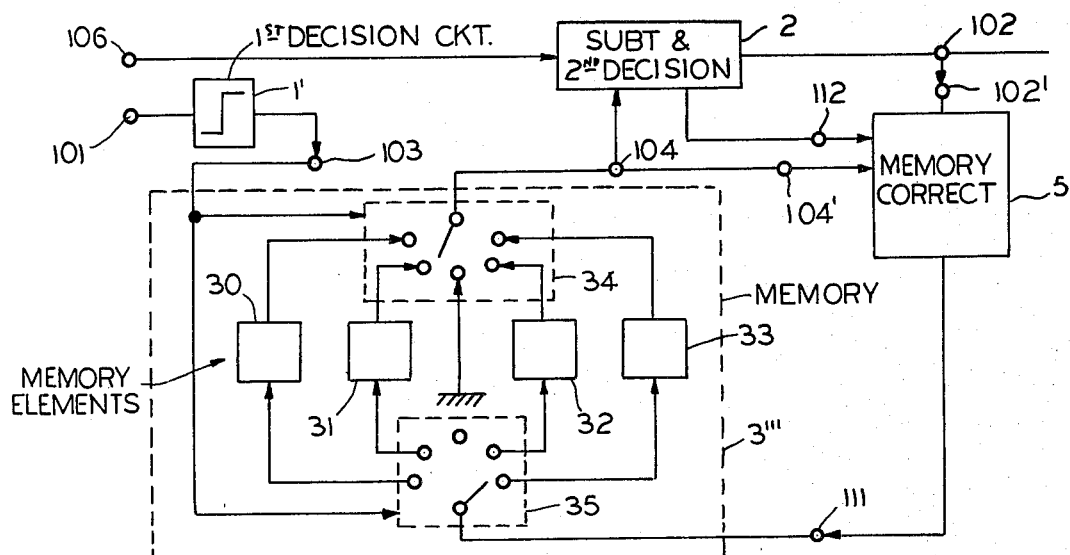

A sixth embodiment with a structure for solving this noise problem is illustrated in FIG. 10. This embodiment has almost the same structure that is shown in FIG. 8, except that the decision circuit 1 has a possible error output signal at terminal 104. This error signal may become effective under the conditions shown in FIG. 6A. That error signal is led to the output terminal 104 by way of the signal selector 34 of the memory circuit 3''' when there is a constant zero error output signal at the input terminal 103. Consequently, incoming data is not affected adversely, as it might not be affected in the third embodiment of FIG. 7. Also, the structure of FIG. 10 can be readily applied to the structure of FIG. 4 as it may be applied to the structure of the third embodiment of FIG. 7.

The memroy circuit 3' of the fifth embodiment (FIG. 9) stores constants, each of which corresponds to one of five symbols (decision values) fed to the input terminals 1030, 1031, 1032, 1033 and 1034. Consequently, the constants inherent in this group of symbols is obtained by rotating the symbol group at $(2\pi/M)n$. The resulting symbols are merely the products of a multiplication of the stored constants by exp $j(2\pi/M)n$, where n is the rotation parameter and M is the number of the modulation phase. Based on this multiplication, the data point arrangements on the IQ plane of quadrature amplitude modulation coincide with one another, when rotated by $(\pi/2)n$ (where n is an integer and M is 4). Each of the four constants correspond to one of the four symbol groups in a relationship of $(\pi/2)n$ rotation, with respect to one another. These four constants can thus be reduced to a single constant. Consequently, each constant is rewritten four times more frequently than it would otherwise be written, thereby achieving a compensation control operation which is four times faster.

Further with respect to M-phase modulated signals, all symbol groups in a relationship of $(2\pi/M)n$ rotation, with respect to one another, have a single constant. Thus, the single constant is rewritten M times more frequently, with a resulting M times faster compensation. The corrected values of constants are obtained in a one-to-one correspondence with all symbol groups (where $n\neq 0$), and are all converted into constant inherent to symbol groups (where n=0). To describe the case where M is 4, for example, a symbol-substituting circuit (FIG. 11) is indispensable to give the value of the rotation parameter n for enabling a decision value made to coincide with the representative decision (referred to as "RD") value. This decision value represents all of the decision values obtained when the first decision value is rotated around the origin on the data point arrangement plane. The rotation is by $(\pi/2)n$ (n being any integer) to give the RD value. In addition, a rotation-converting circuit (FIG. 12) is necessary to obtain the product of the multiplication of an inherent value by $e^{j(\pi/2)n}$ in order to rotate the inherent value by $(\pi/2)n$.

Figure 11:
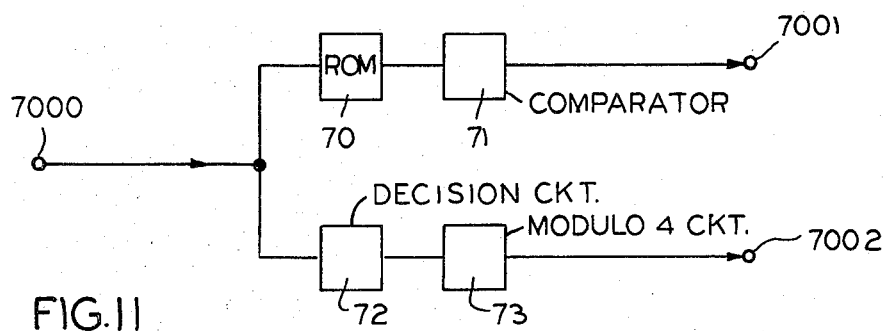
FIGS. 11 and 12 are block diagrams which illustrate a symbol-substituting part and a rotation-converting part of a seventh embodiment.
Figure 14:
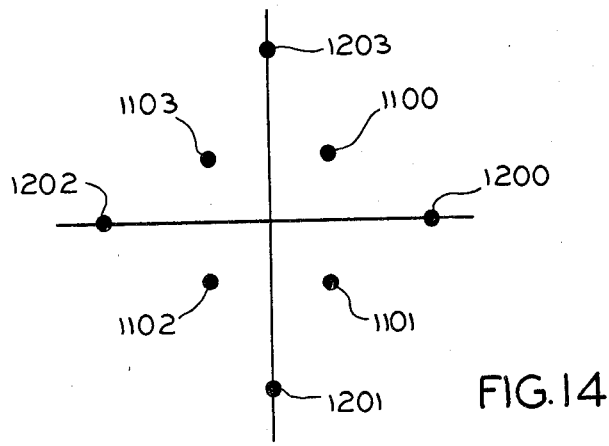
FIG. 14 is a diagram showing amplitude and phase shift keying (APK), modulated data on orthogonal phase planes.

FIG. 11 illustrates the symbol-substituting circuit for APK-modulated signals which are similar to those signals which are shown in FIG. 14, where the following two RD values are assumed. Reference numeral 1100 (FIG. 14) represents the RD value for data points 1100, 1101, 1102 and 1103. Reference numeral 1200 represents the RD value for data points 1200, 1201, 1202 and 1203. These two RD values can be distinguished from each other by their amplitude. The RD value with the smaller amplitude is considered the data point 1100 and the RD value with the greater amplitude is considered the data point 1200. Integers 0, 1, 2, 3, 4, 5, 6 and 7 are assigned to identify the corresponding data points 1100, 1101, 1102, 1103, 1200, 1201, 1202 and 1203, respectively. The rotation parameter n for the two RD values can be obtained by subjecting the assigned integers to modulo 4 arithmetic.

Then, an amplitude estimation is achieved by an absolute value circuit 70 (FIG. 11) consisting of an ROM which stores and supplies absolute values corresponding to input signals. A comparator 71 gives the RD values at an output terminal 7001. Next, the rotation parameter n is given at a terminal 7002 by a decision circuit 72, which has the same structure as the circuit 1 of FIG. 6B, and by a modulo 4 circuit 73.

If QPSK modulation is used with this FIG. 11 circuit, there is only one RD value. Accordingly, neither the circuit 70 nor the comparator 71 will be needed. Further, since there will be only four decision values, 0, 1, 2 and 3, the modulo circuit 73 will not be required either.

Figure 12:
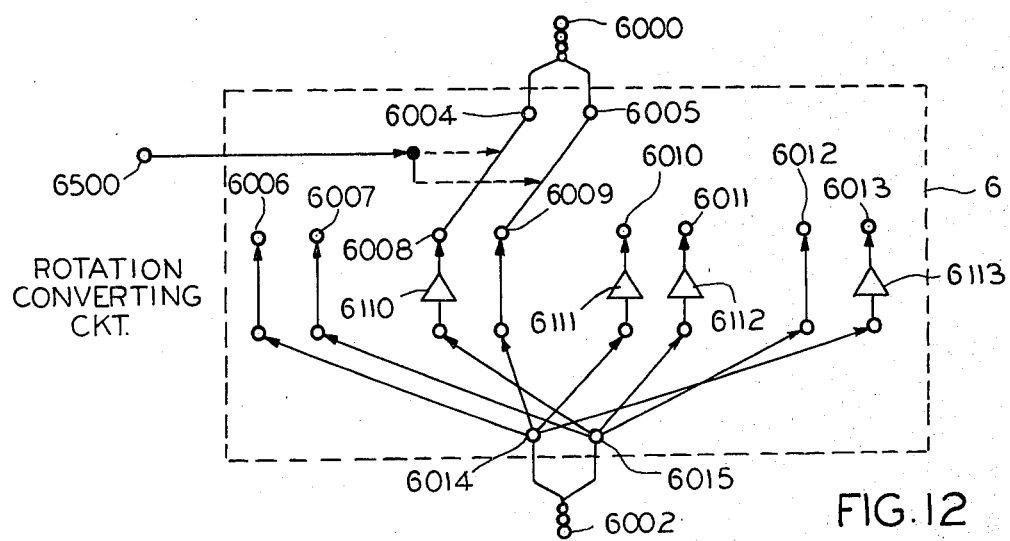
Figure 13:
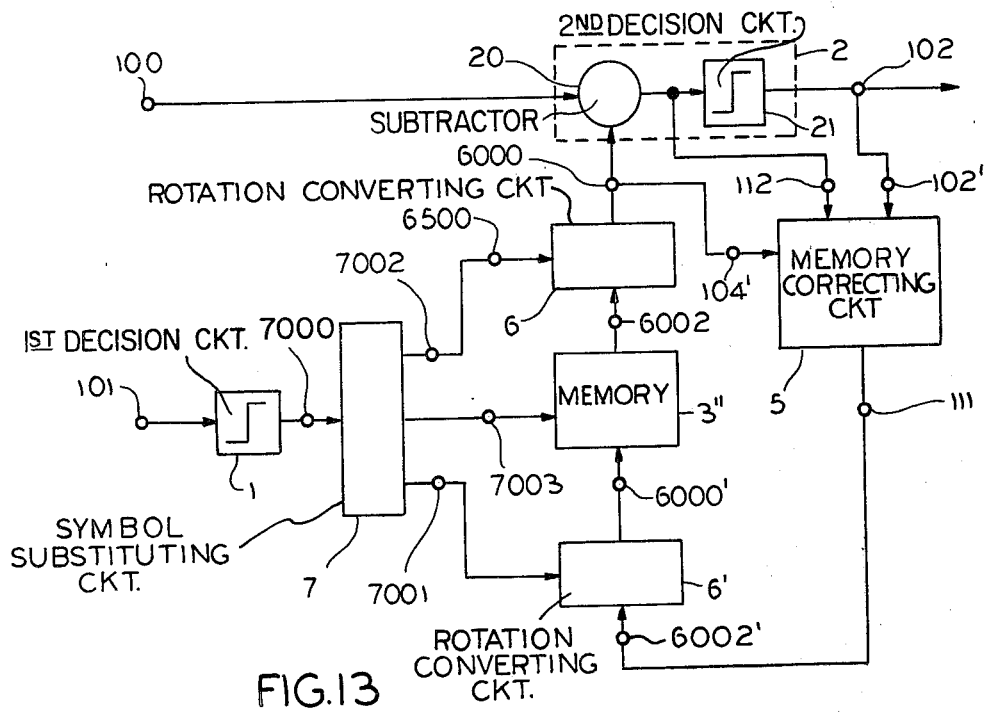
FIG. 13 is a block diagram which illustrates the seventh embodiment.

FIG. 12 is a block diagram of the rotation-converting circuit 6, which is used in FIG. 13. The term "$\epsilon$", is defined by the relationship $\epsilon = a + jb$. Since $\epsilon \cdot e^{j(\pi/2)} = -b + ja$, $\epsilon \cdot e^{j\pi} = -a - jb, \epsilon \cdot e^{j(3/2)\pi} = b - ja$; supposing that $\epsilon = a + jb$. When the real part a and imaginary part b of the input signal is fed to an input terminal 6002, they are supplied to terminals 6014 and 6015. Then, the signals $\epsilon$, $\epsilon \cdot e^{j(\pi/2)}$, $\epsilon$. $e^{j\pi}$ and $\epsilon \cdot e^{j(3/2)\pi}$ emerge at an output terminal 6000 where the values of signals appearing on terminals 6004 and 6005 are expressed in complex numbers, as a result of the interconnection of the terminals 6004 and 6005 with selected ones of the other terminals 6006–6013. The selection is controlled by the signal appearing at an input terminal 6500 (i.e., terminals 6004, 6005 may be connected), to any pair of the terminals (6006, 6007), (6008, 6009), (6010, 6011), or (6012, 6013). Reference numerals 6110 through 6113 identify inverter circuits.

A seventh embodiment (FIG. 13) is formed by supplementing the structure of FIG. 8 with the symbol substituting circuit 7 and the rotation converting circuits 6 and 6'. Accordingly, the reference numerals 1, 2 and 5 identify the structural elements identified by the same numerals in the block diagram of FIG. 8. The memory circuit 3" of this embodiment differs from that of FIG. 8 in that the circuit 3" has one memory element with write-in and readout capabilities.

The operation of the seventh embodiment (FIG. 13) will be described next.

Suppose that a constant corresponding to the data point 4000 of FIG. 1(a) has been written into the memory circuit 3". Then, the decision value obtained in the decision circuit 1 is fed to the symbol substituting circuit 7. There is only one RD value in this example; therefore, there is no need to provide a means for selecting one of the RD values.

The value of the rotation parameter n appears at the output terminal 7002 and is supplied to a terminal 6500 of the rotation converting circuit 6. The output signal of the memory circuit 3" is sent to the rotation converting circuit 6 by way of a terminal 6002. In circuit 6, this output signal is rotated by $(\pi/2)n$, depending on the value of the rotation parameter n which is fed to the terminal 6500. Thus, the output signal returns to the constant which corresponds to the presumed decision value made by the first decision circuit 1. This value is corrected by the memory-correcting circuit 5, and the corrected value is supplied to the input terminal 6002' of the next rotation converting circuit 6'.

The output signal of circuit 7 is supplied to an input terminal 6500' of the rotation-converting circuit 6'. The signal is the rotation parameter n from the output terminal 7001. As a result, the output signal at terminal 6000' of the circuit 6' is the product of a multiplication of the corrected value by $e^{-(\pi/2)n}$ (i.e., the reduced constant, which is read into the memory circuit 3").

In this manner, the value stored in the memory element of the memory circuit 3" is corrected every time that a decision is made, which is four times more frequently it is made than in structure of FIG. 8.

This embodiment is adaptable for QPSK-modulated signals, since there is only one RD value. Thus, the RD value of the symbol-substituting circuit 7 of FIG. 13 is not employed in the memory circuit 3". However, in an APK-modulated wave (such as the one illustrated in FIG. 14), two RD values appear. In this instance, the two RD values are supplied to the memory circui 3" by way of a terminal 7003 (FIG. 13).

Figure 15:
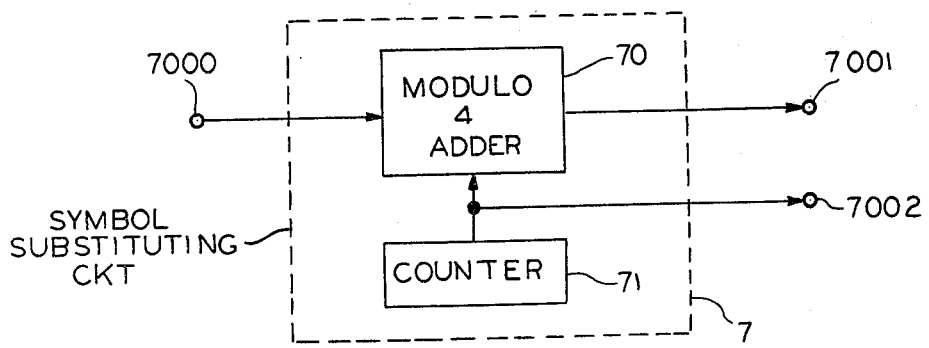
FIG. 15 is a block diagram which illustrates a signal-substituting part of an eighth embodiment.

FIG. 15 shows one example of the symbol-substituting circuit 7, which may be used in QPSK modulation. The block 70 is a modulo 4 adder and the block 71 is a counter. Integers 0, 1, 2 and 3 are respectively assigned to the signal points 4000, 4001, 4002 and 4003 (FIG. 1(a)) of QPSK modulation. Both symbols are then obtained by successive $(2\pi/M)n$ rotations and the rotation parameter n. The substituted symbols are supplied to output terminals 7001 and 7002, respectively, by adder 70 and counter 71.

An eighth embodiment (FIG. 16) has the structure which is originally shown in FIG. 8, with the symbol-substituting circuit 7 and the rotation-converting circuit 6.

Next will be described the operation of this (FIG. 16) embodiment.

First, a presumed decision value is obtained from the decision circuit 1 and is supplied to the substituting circuit 7 via terminal 7000. The value stored in the counter 71 of circuit 7 (FIG. 15) is always first set to zero. The output signal of the modulo 4 adder 70 is the same as the input signal applied thereto. Since the value at terminals 7000 and 7001 are equal to each other, the output signal at terminal 7002 is also zero.

Corresponding to the value signal appearing at the terminal 7001, a corrected value signal passes through circuit 3, terminal 104; circuit 5, and output terminal 111 to the circuit 6. At this stage, the count in the counter 71 (FIG. 15) of circuit 7 successively varies from 0 through 1, 2 and 3. Along with this process, the product of the multiplication of signals at input 7002 by $e^{j(\pi/2)}$, $e^{j\pi}$, and $e^{j(3/2)\pi}$ appear at the output terminal 111' of the converting circuit 6.

At the same time, the value of the signal at the terminal 7001 changes to a decision value, after having undergone a $(2\pi/M)n$ rotation. This decision value is an address which changes the values of signals emerging at the output terminal 111' and which are successively written into the memory circuit 3. In this instance, a corrected value corresponding to a single symbol serves as the correction of constants corresponding to three other symbols. The two circuit 7 and 6 control the memory circuit 3. Accordingly, the compensation control operation of this embodiment is achieved four times faster than the compensation in the embodiment of FIG. 8.

Figure 16:
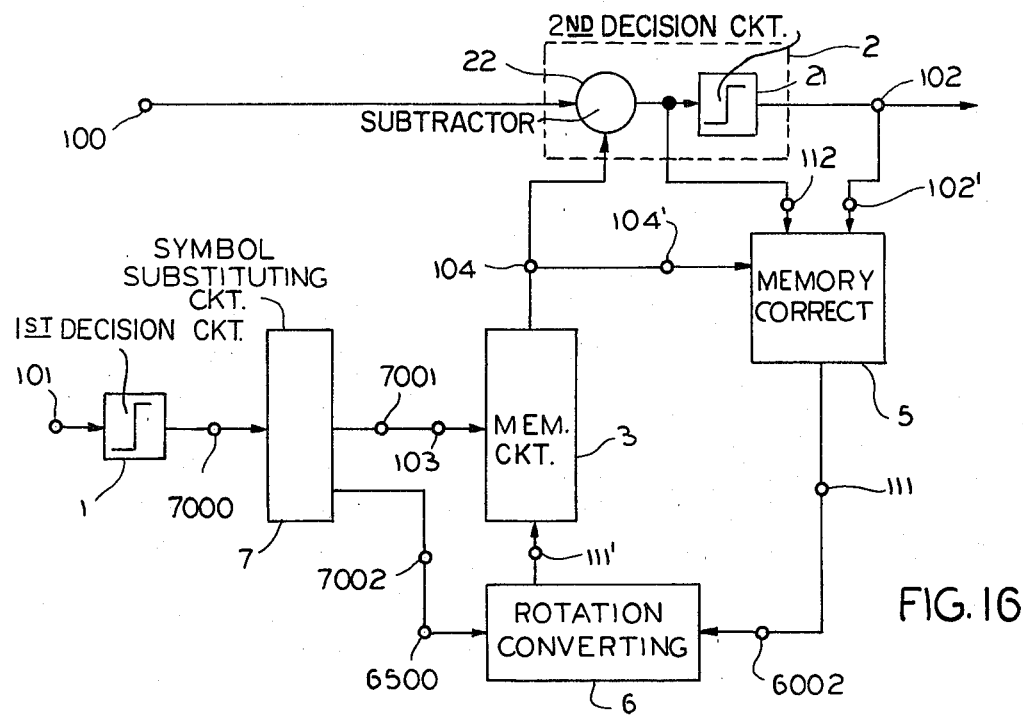
FIG. 16 is a block diagram which shows the eighth embodiment.
Figure 17:
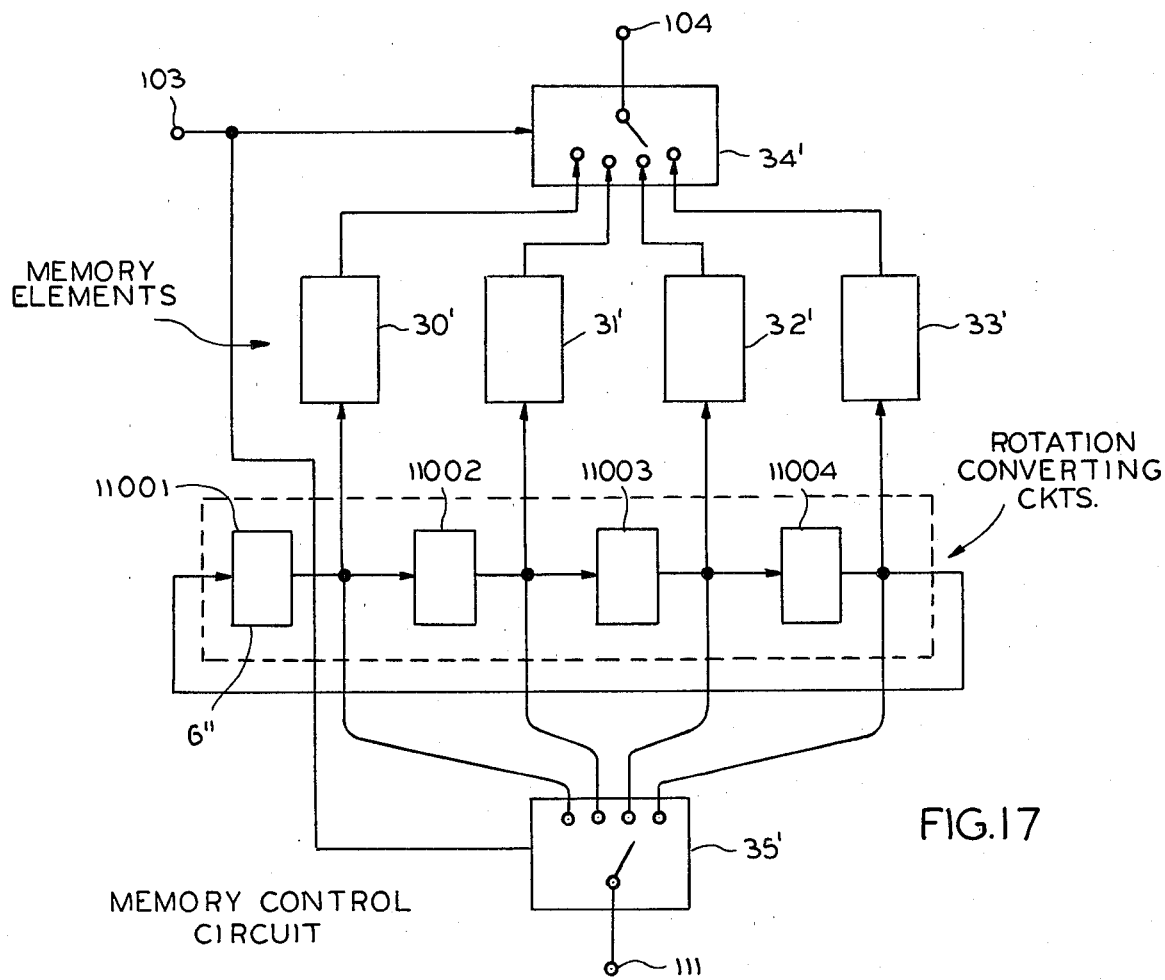
FIG. 17 is a block diagram which illustrates memory control part of the eighth embodiment.

FIG. 17 illustrates a structure using parallel processing in order to achieve the memory control circuit 3 for use in the embodiment of FIG. 16. In the drawing, block 6" is a parallel-processing type rotation-converting circuit.

Except for block 6", the structure of FIG. 17 is exactly the same as block 3''' shown in FIG. 8. The reference numerals 30', 31', 32', 33', 34' and 35' in FIG. 7, respectively, identify circuitry corresponding to the circuits 30, 31, 32, 33, 34 and 35 shown in FIG. 8. Reference numerals 11001, 11002, 11003 and 11004 in block 6" correspond to each of the rotation-converting circuits that are shown in FIG. 12, with their terminals (6004, 6005) permanently connected to terminals (6008, 6009) or (6012, 6013) to achieve $+(\pi/2)$ or $-(\pi/2)$ rotation.

The output value signal of the memory-correcting circuit 5 is supplied to a terminal 111 (FIG. 17). This value signal is fed by a signal line selector 35' to, and is written into, one of memory elements 30' through 33'. At the same time, values resulting from $(\pi/2)n$ rotations of the values appearing at the terminal 111 are given by way of rotation-converting circuit of block 6' to, and are written into, the other three of the memory elements 30'-33'.

In the above-mentioned embodiments, each of the RAMs, ROMs, adder 53, and comparators (1000, 1001, 1002, 1003) may be composed of the ones shown on pages 19, 126 to 127, 222 to 223, and 183 of the DATA MANUAL, entitled "SIGNETICS LOGIC MEMORIES INTERFACE ANALOG MICROPROCESSOR MILITARY", published in 1976 by Signetics Corporation. Also, each of the rectifiers (1010, 1011) may be composed of the one shown in FIG. 4-3-6 on page 183 of COMMUNICATION SYSTEMS AND TECHNIQUES by Mischa Schwartz et al., published in 1966 by McGraw-Hill, Inc.

As described above, the present invention enables cross-polarization interferences to be cancelled in the baseband, as readily as it is cancelled in the IF band. It also enables a cross-polarization sharing of a frequency band, without requiring a modification of a conventional transmission-reception system, which may be inadequate in cross-polarization discrimination.

Furthermore, this invention will prove particularly effective in equalizing cross-polarization in satellite communication, especially in TDMA communication. There, signals from various earth stations must be successively received by the same receiving antenna. This elimination of cross-polarization effects cannot be expected from conventional methods of interference cancellation in either the power feed system or the IF band.

Fading is a principal cause for a deterioration of cross-polarization discrimination because there is an attenuation of the desired polarization components. Although the greatest disturbance in this state occurs because there are undesired cross-polarization components, these components can be cancelled on the receiving side, since the information carried by the undesired cross-polarization components is obtained from a demodulator.

Accordingly, if the cross-polarization discrimination would otherwise deteriorate in an approximately linear relation to the attenuation of the desired cross-polarization components (owing to rain or any other cause, for example), this invention can help maintain the discrimination at a fully acceptable level even if the desired cross-polarization components are attenuated to some extent.

In a radio system, if two stations employ a cross-polarization technique in order to use the same frequency, the phase rotation of the cross-polarization interference components poses a problem in cancelling interference in the baseband. This interference may be caused by the difference between the carrier frequencies of the two transmitting stations. The present invention makes it possible to absorb this phase rotation before cancelling the cross-polarization interference. This absorption enables a cancellation of the cross-polarization interference. Then, the two frequencies are not adversely affected by the difference between the carrier frequencies of the two radio-transmitting earth stations which share the same cross-polarized frequency. Thus, the invention provides a highly useful technique from the standpoint of system designing.

Those who are skilled in the art will readily perceive how to modify the system. Therefore, the appended claims are to be construed to cover all equivalent structures which fall within the true scope and spirit of the invention.

What is claimed is:

1. An equalizer for reducing cross-polarization distortion in digital radio transmission wherein first and second mutually independent sequences of digital data are transmitted via first and second mutually orthogonal cross-polarized waves, said equalizer comprising: first decision circuit means responsive to the second sequence of data means for generating a zero signal as a possible error output signal in a region which is close to signal discrimination boundaries and for generating decision value signals elsewhere than said region; memory circuit means operated responsive to said possible error output signal and having a plurality of memory elements, each of said elements supplying either a signal representing a constant value corresponding to and selected by the output of the decision circuit means, subtractor means for subtracting the output of the memory circuit means from said first sequence of data; and second decision circuit means for distinguishing said first sequence of data from the output of the subtractor means.

2. An equalizer for reducing cross-polarization distortion in digital radio transmission wherein first and second mutually independent sequences of digital data are transmitted via first and second mutually orthogonal cross-polarized waves, said equalizer comprising: first decision circuit means for distinguishing said second sequence of data and giving a decision value signal responsive thereto; memory circuit means having a plurality of memory elements, each of said memory elements normally having a predetermined output, means responsive to an output value signal of said decision circuit means for selecting one memory element, means for correcting said predetermined output of said selected memory element, subtractor means for subtracting the output of the memory circuit means from said first sequence of data; second decision circuit means for distinguishing said first sequence of data out in the output of the subtractor means; and memory-correcting circuit means for correcting the output of the memory circuit means in response to the difference between the input and output of the second decision circuit means, the corrected value being the output of said equalizer.

3. An equalizer for reducing cross-polarization distortion in digital radio transmission wherein first and second mutually independent sequences of digital data are transmitted via first and second mutually orthogonal cross-polarized waves, said equalizer comprising: a first decision circuit means responsive to said second sequence of data for generating a possible error output signal in a region close to signal discrimination boundaries and for giving decision value signals which are located elsewhere than said region; memory circuit means having a plurality of memory elements, each of said memory elements supplying an individually associated constant other than zero, said constant signal corresponding to and selected by the output signal of the decision circuit means and to zero, means responsive to said possible error output signal from said decision circuit means for selecting one of said memory elements; subtractor means for subtracting the output of the memory circuit means from the first sequence of data; second decision circuit means for distinguishing said first sequence of data in the output of the subtractor means; memory-correcting circuit means for correcting the output signal of the memory circuit means in response to the difference between the input and output of the second decision circuit means; and means for supplying the corrected value signal as the output of said equalizer.

4. An equalizer for reducing cross-polarization distortion in digital radio transmission wherein first and second mutually independent sequences of digital data are transmitted via first and second mutually orthogonal cross-polarized waves, said equalizer comprising: first decision circuit means for distinguishing the second sequence of data and giving a decision value signal responsive thereto; symbol substituting circuit means for supplying an output signal which is a representative decision value representing all decision values which may be obtained when the output of said decision circuit means is rotated by $(2\pi/M)n$ (where n is indicative of the rotation parameter and is an integer in the ranging of 0 to $M-1$, where M is the number of the modulation phase), said rotation being around the origin on a plane on which data points are arranged and the rotation parameter is n for the output of said decision circuit; memory circuit means having at least one memory element capable of reading out and writing in information in response to said representative decision value; first rotation-converting circuit means having an output signal which is the product of a multiplication of the output of said memory circuit means by $e^{j(2\pi/M)n}$; subtractor means for subtracting the output of said rotation converting circuit means from the first sequence of data; second decision circuit means for distinguishing the first sequence of data in the output of said subtractor means; memory-correcting circuit means for correcting the output of said first rotation-converting circuit means in response to the difference between the input and output of the second decision circuit means; and second rotation-converting circuit means for giving an output signal representing the product of a multiplication of the output of said memory-correcting output by $e^{(2\pi/M)n}$.

5. An equalizer for reducing cross-polarization distortion in digital radio transmission wherein first and second mutually independent sequences of digital data are transmitted via first and second mutually orthogonal cross-polarized waves, said equalizer comprising: a first decision circuit means for distinguishing the second sequence of data and giving a decision value signal responsive thereto; memory circuit means having a plurality of memory elements, each of said memory elements being capable of selectively reading out and writing in information responsive to each decision value given by said decision circuit means; subtractor means responsive to a decision value output signal from the decision circuit means for subtracting the content of a selected one of said memory element from the first sequence of data; a second decision circuit means for distinguishing the first sequence of data in the output of said subtractor; subtractor means for supplying a difference signal responsive to a difference between the input and output of said second decision circuit means; memory-correcting circuit means responsive to the output of said error detector means for correcting the output of said selected memory element; and memory-controlling circuit means for controlling said selected memory element and writing the product of a multiplication of said corrected value by $e^{j(2\pi/M)n}$ into each of $(M-1)$ memory elements, said written-in product corresponding to $(M-1)$ other decision value signals which are obtained by rotating the output of said first decision circuit by $(2\pi/M)n$ (where n is indicative of the rotation parameter and is an integer ranging from 0 to $(M-1)$ and where M is the number of a modulation phase), said rotation being around the origin on the plane on which data points are arranged.

* * * * *

UNITED STATES PATENT AND TRADEMARK OFFICE
CERTIFICATE OF CORRECTION

PATENT NO. : 4,367,555
DATED : January 4, 1983
INVENTOR(S) : NAMIKI, et al.

It is certified that error appears in the above—identified patent and that said Letters Patent is hereby corrected as shown below:

Col. 8, Line 3, "constant" should be --constants--;

Col. 8, Line 53, "input signal" should be --input signal ε--;

Col. 9, Line 10, "Fig. 1(a) should be --Fig. 1 (a) $\underline{M}$ --;

Col. 9, Line 46, "circui" should be --circuit--.

Signed and Sealed this

Twenty-third Day of August 1983

[SEAL]

Attest:

GERALD J. MOSSINGHOFF

Attesting Officer     Commissioner of Patents and Trademarks